United States Patent
Weber et al.

(10) Patent No.: US 8,829,474 B2
(45) Date of Patent: Sep. 9, 2014

(54) LASER PROTECTION

(71) Applicant: Trumpf Laser- und Systemtechnik GmbH, Ditzingen (DE)

(72) Inventors: Joerg Weber, Obersulm (DE); Joerg Poeppelmann, Stuttgart (DE); Peter Heck, Renningen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 13/864,521

(22) Filed: Apr. 17, 2013

(65) Prior Publication Data

US 2013/0248739 A1 Sep. 26, 2013

Related U.S. Application Data

(63) Continuation of application No. PCT/EP2011/067527, filed on Oct. 7, 2011.

(30) Foreign Application Priority Data

Oct. 8, 2010 (DE) .......................... 10 2010 042 564

(51) Int. Cl.
| | |
|---|---|
| *B82Y 10/00* | (2011.01) |
| *F26B 3/28* | (2006.01) |
| *B23K 26/12* | (2014.01) |
| *B23K 26/00* | (2014.01) |
| *B23K 37/00* | (2006.01) |
| *B23K 26/30* | (2014.01) |
| *B23K 26/38* | (2014.01) |
| *F16P 1/06* | (2006.01) |

(52) U.S. Cl.
CPC .............. *B23K 26/00* (2013.01); *B23K 26/128* (2013.01); *B23K 26/12* (2013.01); *B23K 26/127* (2013.01); *B23K 37/006* (2013.01); *B23K 26/427* (2013.01); *B23K 26/38* (2013.01); *F16P 1/06* (2013.01)
USPC .................. 250/492.1; 250/505.1; 250/515.1; 250/517.1

(58) Field of Classification Search
USPC .............. 250/505.1, 515.1, 517.1; 219/121.6
See application file for complete search history.

(56) References Cited

U.S. PATENT DOCUMENTS

| | | | |
|---|---|---|---|
| 4,107,522 A | * | 8/1978 | Walter .......................... 250/221 |
| 4,650,287 A | * | 3/1987 | Kudo et al. ................. 250/515.1 |

(Continued)

FOREIGN PATENT DOCUMENTS

| | | |
|---|---|---|
| DE | 19629037 C1 | 7/1997 |
| DE | 19736042 A1 | 2/1999 |

(Continued)

OTHER PUBLICATIONS

Notification of Transmittal of the Translation of the International Preliminary Report on Patentability for corresponding PCT Application No. PCT/EP2011/067527, mailed May 2, 2013, 6 pages.

*Primary Examiner* — Phillip A Johnston
*Assistant Examiner* — Hsien Tsai
(74) *Attorney, Agent, or Firm* — Fish & Richardson P.C.

(57) ABSTRACT

A laser protection cabin separates a working space for laser processing from a working space environment and includes a first wall area, in particular a ceiling area, and a second wall area, in particular a lateral wall area. The second wall area, on its interior side facing the working area, in particular in a sub-area adjacent to the first wall area, has a laser beam reflector in order to reflect laser radiation, created during laser processing, onto the first wall area. The first wall area has a surface, on its interior side facing the working area, which absorbs and/or diffusely scatters the laser radiation.

20 Claims, 2 Drawing Sheets

(56) References Cited

U.S. PATENT DOCUMENTS

| | | | |
|---|---|---|---|
| 4,859,055 A * | 8/1989 | Gal et al. | 356/28 |
| 5,309,925 A | 5/1994 | Policastro | |
| 6,107,597 A * | 8/2000 | Staschewski et al. | 219/121.63 |
| 6,518,586 B1 * | 2/2003 | Heberer | 250/515.1 |
| 2003/0051825 A1 | 3/2003 | Toepel | |
| 2007/0170379 A1 * | 7/2007 | Watson et al. | 250/515.1 |
| 2008/0173830 A1 * | 7/2008 | Pieger | 250/515.1 |

FOREIGN PATENT DOCUMENTS

| | | |
|---|---|---|
| DE | 202006006823 U1 | 8/2006 |
| EP | 1908546 A1 | 4/2008 |
| FR | 2832946 A1 * | 6/2003 |

* cited by examiner

LASER PROTECTION

CROSS REFERENCE TO RELATED APPLICATIONS

This application is a continuation of and claims priority under 35 U.S.C. §120 to PCT Application No. PCT/EP2011/067527 filed Oct. 7, 2011, which claimed priority to German Application No. 20 2010 042 564.8, filed Oct. 18, 2010. The contents of both of these priority applications are hereby incorporated by reference in their entirety.

TECHNICAL FIELD

The invention relates to a laser protection cabin to separate a laser processing space from a working space environment. The invention also relates to a laser processing system with such a laser protection cabin.

BACKGROUND

Laser protection cabins are used to screen off working spaces in which laser processing machines are operated. Such screening from the working space environment is stipulated in particular for reasons of safety at work. In accordance with the relevant safety regulations, it is necessary to guarantee that, including in connection with irregular operating states of the laser processing machine and at least for a limited period of time, no harmful laser radiation can be emitted from the interior of the working space into the working space environment.

EP 1 908 546 A1 describes a working space, with a laser processing machine in the interior of the working space, which is screened off from the working space environment by means of a laser protection cabin. On its side facing the laser processing machine, the laser protection cabin has a laser beam reflector by means of which the predominant part of the laser radiation that is emitted by the laser processing machine and strikes the laser beam reflector is reflected diffusely. A diffusely reflecting metal surface, in particular an aluminum surface, can, for example be used as a laser beam reflector, and can, for example, be provided with irregularly profiled surface structures in order to bring about intensive scatter of the laser light. Aluminum is particularly suited as a material for the laser beam reflector on account of its low weight and relatively low thermal conductivity.

U.S. Pat. No. 4,650,287 A discloses a laser-light shield with a metallic substrate with a radiation-absorbing coating in the form of a flame-sprayed film consisting of ceramic metal oxide. A surface of the metallic substrate has unevenness, the height of which is greater than the thickness of the metal oxide film so that the upper side of the metal oxide film essentially reproduces the unevenness of the metallic substrate. The ceramic metal oxide film can, for example, consist of a combination of $Al_2O_3$ and $TiO_2$ and is described in U.S. Pat. No. 4,650,287 A as being extraordinarily heat-resistant and absorbent.

U.S. Pat. No. 5,309,925 describes a reflective metallic foil on which, to protect people against laser radiation, a surface structure is applied which diffusely reflects a laser beam that strikes the foil, scattering the laser beam in multiple directions.

DE 20 2006 006 823 U1 describes a non-flammable textile material on which, on at least one side, a foil material layer is applied that, on its externally facing side, has at least one metal or oxide ceramic coating, applied by means of a thermal coating process, and is designed to scatter the laser beam striking it very efficiently by launching and subsequently diffusely scattering it. The foil material layer can consist of a highly reflective metal, for example aluminum, and the process-related parameters for the thermal coating can be selected in such a way that the absorption and resistance of the material are increased.

To increase the absorption of laser radiation, the prior art, for example DE 19736042 A1, also describes blackening the inner surface of a beam dump.

In the laser protection cabin described in EP 1 908 546 A1, the working space environment is protected against the laser radiation from the laser processing machine. If there are several working areas in the working space of the laser protection cabin, laser processing can take place in a first working area while, in a second working area, a person can be in the working space, for example to carry out activities at the second working area such as final inspection of the laser processing or a loading or removal process. If different working areas share equipment, for example a laser processing machine head, the working areas usually cannot simply be separated from each other with full light-proofing so that laser radiation is able to pass from one working area to another unintentionally.

In such a laser processing system, as offered by TRUMPF Inc., for example, in the TruLaser® Cell 7000 series, it is necessary to ensure that the stipulated radiation thresholds are also complied with for the radiation accessible in a working area in the interior of the laser protection cabin in which no laser processing takes place.

SUMMARY

One aspect of the invention provides a laser protection cabin and a laser processing system in which sufficient protection against laser radiation from another working area can be offered to an operator inside the laser protection cabin in a working area in which no laser processing is taking place.

This aspect features a laser protection cabin in which a second or side wall area, on its interior side facing the working space, in particular in a sub-area adjacent to a first or ceiling wall area, has a laser beam reflector in order to reflect laser radiation created during laser processing to the first wall area, wherein the first wall area has a surface, on its interior side facing the working space, that absorbs and/or diffusely scatters the laser radiation.

In accordance with the invention, the laser protection cabin has a laser beam reflector in the second, in particular side, wall area, and an absorbent and/or diffusely scattering surface in the first wall area. The first wall area is positioned in such a way that, upon reflection of laser radiation onto the first wall area, laser radiation from a first working area in which laser processing is taking place could be emitted into a working area not being used for laser processing. In order to prevent this, or to reduce the radiation intensity in a working area not being used for laser processing to a level below the fixed thresholds, the first wall area is provided with an absorbent and/or diffusely scattering surface. The laser beam reflector is arranged in such a way that laser radiation reflected from it strikes the absorbent and/or diffusely scattering surface. This can be achieved, in particular, if the laser beam reflector is provided at least in a sub-area of the second wall area adjacent to the first wall area.

If a partition device runs between two working areas, for example in a vertical direction, this sub-area can, for example, be created above the partition device between the two working areas so that laser radiation emitted from the working areas is reflected by the laser beam reflector onto the ceiling area.

The provision of laser beam reflectors on the lateral wall areas makes it possible to target the reflection at the ceiling area. If diffuse reflectors were provided on the lateral wall areas, on the other hand, the diffusely reflected radiation would be closer to the operator so that the impact would be higher there. Therefore, the absorbent and/or diffusely scattering surface is typically restricted to the ceiling area.

The measures described above ensure that laser radiation emitted from any working area reaches the first wall area, on which it is absorbed or diffusely scattered so that any laser radiation emitted from the first wall area into another working space only has such a low intensity that it is restricted to a permissible threshold. This applies in particular also to the case in which the laser processing machine is operated with a solid state laser for which the radiation thresholds are particularly low.

In a preferred embodiment, the diffusely scattering surface is created by a surface structure on a substrate, in particular on a metallic substrate. This surface structure is produced by means of unevenness on the surface of the in particular metallic substrate.

This unevenness can, for example, be created by means of regular or irregular indentations, elevations or the like. If a laser beam strikes such a surface structure, it is diffusely scattered, i.e., in multiple directions. The energy of the scattered laser radiation is therefore distributed over a large area angle range, in contrast to reflection in a single direction.

This can be, in particular, made possible by a combination of the surface structure with an absorbent film that is applied to the surface structure and is sufficiently thin that the top of the film essentially reproduces the unevenness of the substrate. This allows the sensitivity of the absorbent film to contamination (for example deposits, oil, etc.) to be reduced as it is deposited in the depressions in the surface structure, while the elevations still retain their original state and thus continue to absorb the laser radiation to an adequate extent.

The surface structure may be created by roughening the substrate, such as a metallic substrate, to a depth of roughness of at least 10 µm, preferably at least 30 µm. For optimum scattering of the incident laser radiation and/or protection against contamination, a particularly rough surface must be produced. The surface structure is preferably produced by means of sandblasting or blasting with chilled cast iron. With this process, for example, depths of roughness of approximately Rz=30 µm and more can be produced.

The metallic substrate may be, for example, aluminum. Aluminum demonstrates high thermal conductivity. This is particularly advantageous if a high level of energy is introduced into the material, for example in connection with the absorption of laser radiation, if an absorbent film is applied to it (see below). Furthermore, aluminum has a relatively low weight and is easy to work.

In another embodiment, the absorbent surface is created on a film that absorbs the laser radiation. The absorbent film is typically applied to a base material which itself tends to have a low absorption capacity for the laser radiation. For example, the absorbent film can be applied to a metallic substrate. If laser radiation is absorbed, the absorbent film is heated on account of the high energy input. As a result of the high thermal conductivity of the preferably metallic substrate, the thermal impact on the absorbent film and the substrate itself is, however, kept as low as possible. This increases the durability of the absorbent film. The absorbent film can, of course, be applied in particular to the surface of a preferred metallic substrate, with its film thickness selected in such a way that the surface of the absorbent film essentially reproduces the surface structure of the substrate. In this way, an absorbent and (diffusely) scattering surface can be created, which contributes particularly effectively to the reduction of the radiation intensity in the laser protection cabin.

The absorbent film may be made of a black, matt lacquer film. For example, heat-resistant wet lacquer can be used to create the absorbent film. Such a lacquer film produces optimum absorption and can be applied particularly easily.

In another embodiment, at least one wire mesh layer is arranged at a distance from the absorbent and/or diffusely scattering surface. A wire mesh layer may increase the scattering effect and reduces the sensitivity to dirt of the absorbent and/or diffusely scattering surface. The residual radiation reflected (diffusely) from the absorbent and/or diffusely scattering surface is also partially absorbed by the wire mesh layer. The wire mesh layer is preferably arranged at a distance of approximately 20 mm from the surface. Each additional wire mesh layer that is arranged at a distance of approximately 20 mm from the previous wire mesh layer further increases the scattering effect. However, this effect is not linear, for which reason no more significant efficiency enhancements are generally achieved by installing more than two wire mesh layers.

In another preferred embodiment, the laser beam reflector consists of a blank metallic surface. For example, blank aluminum is used as the laser beam reflector. This material has a very high reflection factor, low weight and high thermal conductivity so that intensive spot laser radiation does not lead to destruction of the laser beam reflector.

In another embodiment, the laser beam reflector is aligned at a right angle or an acute angle to the first wall area. Such an alignment allows the targeted reflection to the ceiling area to be improved. Angles between approximately 80°/85° and 90° have proven to be particularly favorable for this purpose.

Another aspect of the invention also includes a laser processing system, comprising a laser processing machine for laser processing of a workpiece, and a laser protection cabin as described above. By means of the laser protection cabin, the working space environment of the laser processing system and a working area in the interior of the laser protection cabin at which no laser processing is taking place are protected against the laser radiation produced by the laser processing machine.

In some embodiments a vertical partition device is arranged in the working space to divide the working space into at least two working areas, and the partition device does not extend to the first wall area. If two (or more) working areas, such as adjacent working areas, are provided within the laser protection cabin, one working area can, for example, be equipped with material to be processed or processed material can be removed from it while, at the same time, at another working area, a measurement or test can be carried out and in another working area laser processing can be carried out. This leads to a time saving and thus to increased productivity of the laser processing system. The partition device is used to screen the laser radiation produced in one of the working areas during laser processing. The partition device does not usually extend to the first wall area, in order to allow for transportation of shared equipment between the working areas. To prevent laser radiation from being reflected from one working area to another working area with possibly harmful radiation intensity, the first wall area is provided with an absorbent and/or scattering surface.

In a preferred improvement of the above laser processing system, the sub-area of the second wall area with the laser beam reflector adjacent to the first wall area is restricted to the area into which the partition device does not extend. With a vertical partition device, the sub-area of the lateral wall area can start at a height of, for example, 1,800 mm or 2,000 mm above the floor on which the laser protection cabin is placed. Only the laser radiation that is no longer captured by the partition device is reflected in this case by the laser reflector to the ceiling area and there absorbed and/or diffusely reflected.

In some examples, a movement device to move a laser processing head is arranged in the working space, such as above the partition device. The movement device is designed to travel across the partition device when working areas are changed. The movement device, for example a linear drive to move the suspension of the laser processing head along a guide rail, makes it possible to travel to two or more working areas and process components alternately in the working areas.

In some cases, the movement device and/or other components arranged in the area into which the partition device does not extend, have an absorbent and/or diffusely reflecting surface. The movement device and any other components arranged inside the laser protection cabin can be clad with an absorbent and/or diffusely scattering surface in the area into which the partition device does not extend, for example above the partition device, such as from a height of approximately 1,800 mm or 2,000 mm above the floor. This avoids uncontrolled spread of the laser radiation in the working space as a result of unintended reflection on these components.

In some cases, the movement device and/or other components arranged in the area into which the partition device does not extend, have a laser beam reflector to reflect laser radiation to the first wall area. In this connection, surfaces such as those aligned in such a way that they would reflect the laser radiation back to the working areas can be screened with a laser beam reflector that is aligned in such a way that the laser radiation is redirected to the first wall area.

In a particularly preferred embodiment, the laser processing machine comprises a solid state laser to produce the laser radiation. The potential for harm to the human eye is markedly higher with laser radiation produced by solid state lasers, on account of the wavelengths used here (in or close to the visible wavelength range), than with laser radiation produced by $CO_2$ lasers (in the IR range).

Accordingly, the radiation thresholds that must be complied with when using solid state lasers are lower by a factor of approximately 20 than those for, for example, $CO_2$ lasers. Further advantages of the invention are provided in the description and the drawings. Similarly, the above-mentioned characteristics and those described below can be used individually or in any combinations. The embodiments shown and described should not be considered to be an exhaustive list. They are instead examples for the purposes of describing the invention.

DESCRIPTION OF DRAWINGS

Like reference symbols in the various drawings indicate like elements.

DETAILED DESCRIPTION

Figure 1:
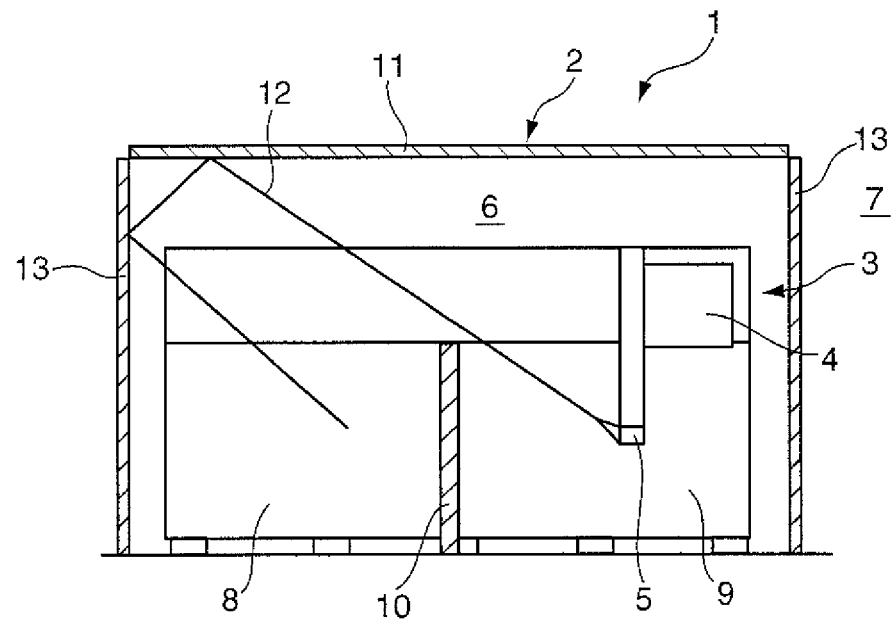
FIG. 1 shows a laser processing system with a laser processing machine and a laser protection cabin according to the state of the art.

FIG. 1 shows a laser processing system 1 with a laser protection cabin 2 and a laser processing machine 3 arranged in the laser protection cabin 2 for 3D laser processing, in particular for laser cutting of workpieces (not shown). The laser processing machine 3 comprises a movement device 4 to move a laser processing head 5.

The laser protection cabin 2 separates a working space 6 from a working space environment 7. The working space 6 enclosed by the laser protection cabin 2 has a first working area 8 and a second working area 9 in each of which laser processing can be carried out. The spatial separation between the first and second working areas 8, 9 is achieved by means of a partition device created as a laser-resistant partition 10. The partition 10 prevents laser radiation from passing between the two working areas 8, 9 but does not extend to a horizontal ceiling area 11 of the laser protection cabin 2 to allow movement of the laser processing head 5 from the second working area 9 to the first working area 8 and vice versa. The laser processing head 5 is moved between the working areas 8, 9 by linear displacement of the laser processing head 5 in a horizontal direction by means of the movement device 4, on which the laser processing head 5 is arranged. Depending on the position of the laser processing head 5, displacement takes place simultaneously in a vertical direction to avoid collision and/or to comply with the travel strategy.

As shown in FIG. 1, during laser processing in the second working area 9, laser radiation 12 can be spread from the laser processing head 5 over the partition 10 in the direction of the ceiling 11. The laser radiation 12 is then reflected from the ceiling 11 to a lateral wall area 13 (side wall) of the laser protection cabin 2 and from there in the direction of the first working area 8. If at this time there is a person in the first working area 8, if the laser radiation 12 there exceeds a specified radiation intensity threshold this person can, for example, be damaged in the eye by the reflected laser radiation 12 that is concentrated in a small room area.

Figure 2:
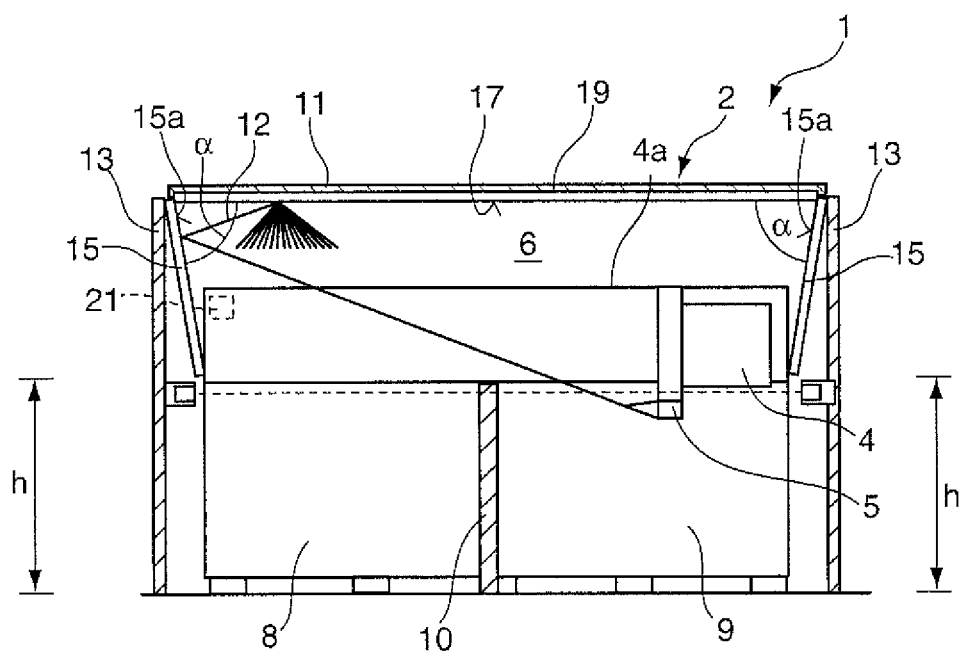
FIG. 2 shows a laser processing system according to the invention with a laser processing machine and a laser protection cabin.

A laser processing system 1 which avoids this problem is shown in FIG. 2. The laser protection cabin 2 has, at the inside of each of the lateral walls 13 in an upper sub-area adjacent to the ceiling area 11, a laser beam reflector 15 that consists of a metal disk, for example of aluminum, which has a blank reflective surface 15a. In this connection, the lateral walls 13 can be created on their insides as laser beam reflectors 15 (not shown). In the example shown in FIG. 2, the laser beam reflector 15 is arranged on the inside of the lateral walls 13, but forms an acute angle α of, for example, 85° with the ceiling area 11 to improve the targeted reflection in the direction of the ceiling area 11. The angle α must, of course, be selected in such a way that the laser beam reflector 15 does not collide with other structural elements arranged in the laser protection cabin 2.

The sub-areas with the laser beam reflector 15 start from a height h of approximately 2,000 mm, measured from the floor on which the laser protection cabin 2 and/or the laser processing machine 3 are arranged, and extend to the upper end of the lateral walls 13. The height h essentially corresponds to the height of the partition 10 that separates the two working areas 8, 9 from each other and extends to a beam 4a, which is part of the movement device 4 and runs in a horizontal direction.

A metallic support plate 19 is arranged on the inside of the ceiling 11 as a substrate and a diffusely scattering, absorbent surface 17 is created on it. In an alternative embodiment, the metallic carrier plate 19 can itself form the ceiling 11. The carrier plate 19 consists preferably of aluminum. Other materials, in particular metals, with a high thermal conductivity may also be used as the metallic substrate 19.

If, as shown in FIG. 2, laser radiation 12 strikes the laser beam reflectors 15 of the lateral walls 13, it is reflected in the direction of the absorbent, diffusely scattering surface 17 of the ceiling 11 as the laser beam reflectors 15 are arranged above the working areas 8, 9. Herein, a large part of the laser radiation 12 is absorbed on the surface and only the non-absorbed part of the laser radiation 12 is scattered by the scattering surface 17 diffusely back into the interior of the working space 6. If the laser radiation 12 strikes the absorbent, diffusely scattering surface 17 directly, it is also largely absorbed and only a small part is scattered back into the interior of the working space 6. In this way, the intensity of the laser radiation 12 that passes from the second working area 9 to the first working area 8 is reduced to such an extent that the radiation intensity thresholds can be complied with.

In addition to the ceiling 11, all other potentially reflective objects in the interior of the working space 6 that are arranged above the partition 10, in particular the movement device 4 with the beam 4a, may be provided with either a diffusely scattering or absorbent surface or a blank metallic surface. Blank metallic surfaces should only be used as screens if they are aligned in such a way that the laser radiation 12 is reflected by them to the ceiling 11 or is not reflected into one of the working areas 8, 9.

While only the side walls 13 and ceiling 11 of the laser protection cabin 2 are illustrated, the front and rear sides (not shown) of the laser protection cabin 2 are also fitted with laser beam reflectors 15. The laser protection cabin does not also have to have essentially rectangular geometry in its cross-section, as shown in FIG. 2. It can also be of other shapes.

The absorbent and/or diffusely scattering surface 17 need not be created on a ceiling surface of the laser protection cabin 2. For example, in the case that the partition 10 extends to the ceiling 11 but not to a side wall of the laser protection cabin, this side wall can be provided with an absorbent and/or diffusely scattering surface in order to prevent reflection and thus the transfer of laser radiation between the working areas 8, 9. In this example (not shown), the movement device is arranged not above, but beside the working areas 8, 9.

Figure 3:
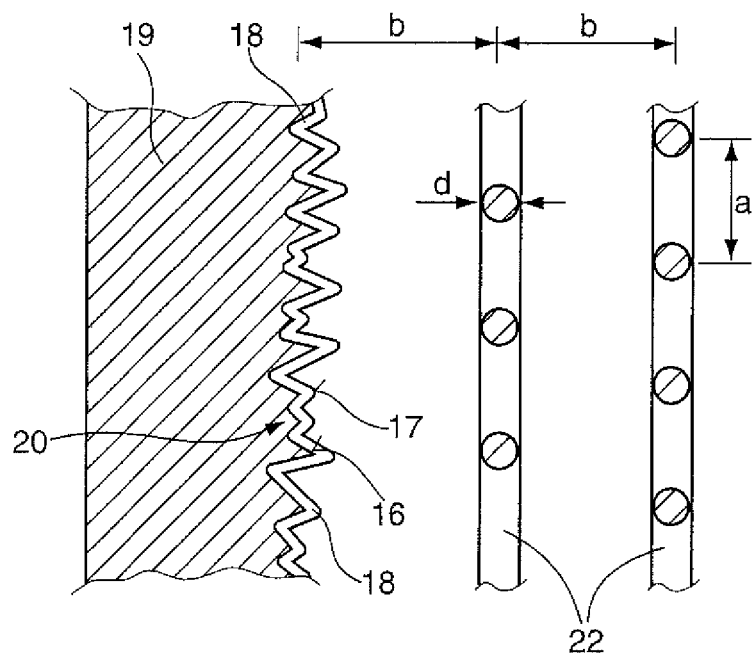
FIG. 3 shows a metallic substrate with an absorbent film and two wire mesh layers in a section view.

FIG. 3 illustrates how the absorbent, scattering surface 17 may be produced on the metallic carrier plate 19 (substrate). The metallic substrate 19 has, on its right side as shown in FIG. 3, a surface 16 on which a surface structure 20 is created. The surface structure 20 consists of unevenness that has been produced by roughening the metallic substrate 19. For example, the metallic substrate 19 can be roughened by means of sandblasting or blasting with chilled cast iron. However, other processing methods can also be used by means of which a surface structure 20 with a depth of roughness of at least Rz=10 μm, preferably with a depth of roughness of at least approximately Rz=30 μm, can be produced. As a result of the surface structure 20, the surface 16 of the metallic substrate 19 serves as a scattering surface.

An absorbent film 18 is applied to the diffusely scattering surface 16. In the present example, this consists of a black matte, heat-resistant lacquer film in the form of wet lacquer. The film 18 of wet lacquer absorbs laser radiation 12 and transfers the energy absorbed thereby to the metallic substrate 19, which is able to dissipate it rapidly on account of its very high thermal conductivity. The film 18 has a lower film thickness than the depth of roughness so that the outer surface 17 of the absorbent film 18 essentially reproduces the surface structure 20 of the substrate 19 and thus creates both an absorbent and scattering surface.

FIG. 3 also shows two wire mesh layers 22 that are arranged at a distance from the absorbent film 18. A distance 'b' between the absorbent film 18 and the first wire mesh layer 22 of approximately b=20 mm is preferably selected. The second and each additional wire mesh layer 22 are also arranged at a distance of approximately b=20 mm to each preceding wire mesh layer 22. The wire diameter 'd' of each wire mesh layer 22 depends on the (maximum) laser power of the laser processing machine. A high laser power requires a higher wire diameter to guarantee useful life. This is the case in particular if the wire mesh layer 22, as in the present example, is provided with an absorbent film of black matte, heat-resistant wet lacquer that can be protected more effectively against overheating with a higher wire diameter. The wire diameter can, for example, be approximately d=1 mm. The individual wires have a distance 'a' from each other that is selected depending on the desired permeability (in %) of the wire mesh layer 22 and can, for example, be approximately a=5 mm. The wire mesh layers 22 can be arranged on the side of the ceiling 11 of the laser protection cabin 2 facing the working space 6 or on the carrier plate 19, for example using spacers that do not themselves reflect laser radiation.

Figure 4:
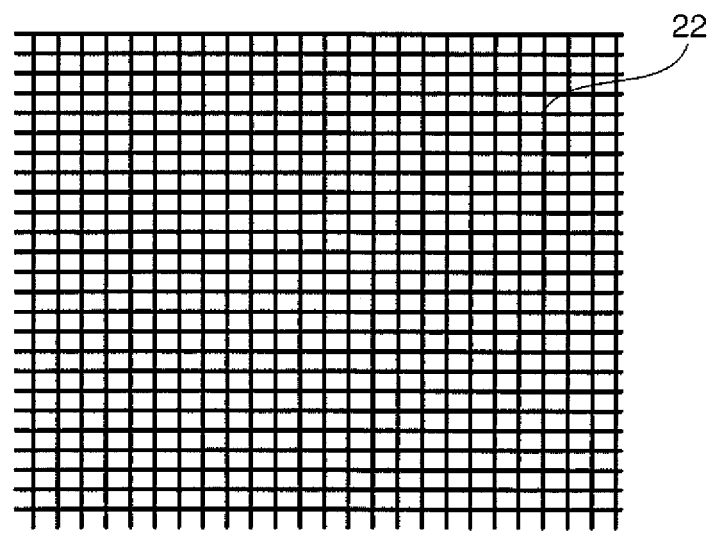
FIG. 4 shows a top view of a wire mesh layer.

FIG. 4 shows a wire mesh layer 22 with square mesh in plain weave and a wire diameter of approximately 1 mm. The wire mesh layer 22 acts as a permeable absorber and has permeability of 50% in both directions. In other words, only 50% of both the laser radiation 12 redirected to the absorbent, diffusely scattering surface 17 and of the laser radiation 12 reflected by it can pass through the wire mesh layer 22. As FIG. 3 shows, the wires of different wire mesh layers 22 are arranged offset from each other in order to increase the scatter effect and/or to reduce the permeability and to keep dirt away from the absorbent, diffusely scattering film 17.

In particular with the use of several wire mesh layers 22, it may also be possible to provide a surface on the inside of the ceiling 11 which is created to be only scattering or only absorbent. In the first case, it is possible to do without the absorbent film 18 on the surface structure 20. In the second case, an absorbent film 18 can be applied, for example, to a blank, planar metal surface. The (low) radiation intensity thresholds that apply to the use of a solid state laser 21 (cf. FIG. 2) for the production of laser radiation can also be complied with in the laser protection cabin 2 in this case.

A number of embodiments of the invention have been described. Nevertheless, it will be understood that various modifications may be made without departing from the spirit and scope of the invention. Accordingly, other embodiments are within the scope of the following claims.

What is claimed is:

1. A laser protection cabin defining a laser processing working space from a surrounding working environment, the cabin comprising:
    a first internal wall area having a surface configured to absorb and/or diffusely scatter laser radiation, the first internal wall area comprising an area of ceiling of the cabin; and
    a second internal wall area comprising an area of a side wall of the laser protection cabin, and on a side facing the laser processing working space, a laser beam reflector positioned at an angle with the ceiling area so as to reflect laser radiation created during laser processing within the laser processing working space, onto the first internal wall area in a targeted manner.

2. The laser protection cabin of claim 1, wherein the cabin defines two internal laser processing working areas separated by a partition, the laser beam reflector positioned to intercept laser radiation entering one laser processing working area from the other laser processing working area across the partition, and to reflect the intercepted laser radiation onto the first internal wall area.

3. The laser protection cabin of claim 1, wherein the surface of the first internal wall area has a surface roughness selected to diffusely scatter the laser radiation.

4. The laser protection cabin of claim 3, wherein the first internal wall area has a metallic substrate.

5. The laser protection cabin of claim 4, wherein the surface roughness corresponds to a roughness of the metallic substrate and has a depth of roughness of at least 10 μm.

6. The laser protection cabin of claim 5, wherein the depth of roughness is at least 30 μm.

7. The laser protection cabin of claim 4, wherein the metallic substrate is made from aluminum.

8. The laser protection cabin of claim 1, wherein the surface of the first internal wall area is a laser radiation absorption surface and comprises a film supported on a substrate and of a material that absorbs laser radiation.

9. The laser protection cabin of claim 8, wherein the film comprises a black, matte lacquer film.

10. The laser protection cabin of claim 1, wherein the laser beam reflector has a metallic surface.

11. A laser protection cabin of claim 1, wherein the laser beam reflector is aligned at an acute angle to the first internal wall area.

12. The laser protection cabin of claim 1, further comprising at least one wire mesh layer spaced at a distance from the surface of the first internal wall area.

13. A laser processing system, comprising:
a laser processing machine having a laser processing head that directs laser radiation onto a workpiece; and
the laser protection cabin of claim 1, positioned such that the laser processing head is disposed within the laser processing working space.

14. The laser processing system of claim 13, wherein the laser protection cabin comprises two internal laser processing working areas divided by a partition, the partition leaving a gap at an edge of the partition through which laser radiation may pass from one of the laser processing working areas into the other.

15. The laser processing system of claim 14, wherein the laser beam reflector only covers that portion of the second internal wall area exposed to laser radiation passing through the gap.

16. The laser processing system of claim 14, wherein the gap is disposed above the partition, and wherein the first internal wall area comprises an area of a ceiling of the cabin.

17. The laser processing system of claim 14, wherein the laser processing machine comprises a head movement device configured and arranged to travel across the partition to move the laser processing head from one laser processing working area to the other.

18. The laser processing system of claim 17, wherein the head movement device has a laser-reflective surface.

19. The laser processing system of claim 17, wherein the head movement device has a surface configured to absorb and/or diffusely scatter the laser radiation.

20. The laser processing system of claim 14, wherein the laser processing machine comprises a solid state laser to produce the laser radiation.

* * * * *

UNITED STATES PATENT AND TRADEMARK OFFICE
CERTIFICATE OF CORRECTION

| | | |
|---|---|---|
| PATENT NO. | : 8,829,474 B2 | Page 1 of 1 |
| APPLICATION NO. | : 13/864521 | |
| DATED | : September 9, 2014 | |
| INVENTOR(S) | : Joerg Weber, Joerg Poeppelmann and Peter Heck | |

It is certified that error appears in the above-identified patent and that said Letters Patent is hereby corrected as shown below:

On the Title Page (Foreign Application Data), delete "Oct. 8, 2010" and insert --Oct. 18, 2010--.

In the Specification

Column 1, line 9, delete "20 2010 042 564.8" and insert --10 2010 042 564.8--.

In the Claims

Column 8, line 53, in Claim 1, after "space" insert --separated--.

Column 9, lines 27-29, in Claim 11, delete "A laser protection cabin of claim 1, wherein the laser beam reflector is aligned at an acute angle to the first internal wall area", and insert --The laser protection cabin of claim 1, wherein the angle is a right or acute angle--.

Signed and Sealed this
Third Day of March, 2015

Michelle K. Lee
*Deputy Director of the United States Patent and Trademark Office*